United States Patent
Zhang et al.

(10) Patent No.: US 7,822,572 B2
(45) Date of Patent: *Oct. 26, 2010

(54) METHOD AND DEVICE FOR CALIBRATION OF DIGITAL CELESTIAL SENSOR

(75) Inventors: Guangjun Zhang, Beijing (CN); Xinguo Wei, Beijing (CN); Qiaoyun Fan, Beijing (CN); Jie Jiang, Beijing (CN)

(73) Assignee: Beihang University, Beijing (CN)

( * ) Notice: Subject to any disclaimer, the term of this patent is extended or adjusted under 35 U.S.C. 154(b) by 356 days.

This patent is subject to a terminal disclaimer.

(21) Appl. No.: 12/036,888

(22) Filed: Feb. 25, 2008

(65) Prior Publication Data

US 2009/0012734 A1    Jan. 8, 2009

Related U.S. Application Data

(63) Continuation-in-part of application No. 12/019,539, filed on Jan. 24, 2008, now abandoned.

(30) Foreign Application Priority Data

Jul. 6, 2007    (CN) .......................... 2007 1 0118498

(51) Int. Cl.
*G01C 25/00* (2006.01)
(52) U.S. Cl. ...................... 702/105; 324/252; 702/82; 702/104

(58) Field of Classification Search ............... 702/33, 702/36, 85, 91, 93, 94, 95, 104, 105, 107, 702/127, 150–15, 163, 179, 189, 196; 250/203.4, 250/252.1; 244/3.16, 3.21; 382/103; 342/352, 342/354, 360; 701/222
See application file for complete search history.

(56) References Cited

U.S. PATENT DOCUMENTS 5,831,572 A * 11/1998 Damilano .............. 342/352
6,087,646 A * 7/2000 Didinsky ............. 250/203.4

OTHER PUBLICATIONS

Dr. Carl Christian Liebe, Dr. Sohrab Mobasser, "MEMS based sun sensor"—Aerospace Conference, 2001.*

* cited by examiner

*Primary Examiner*—John H Le
(74) *Attorney, Agent, or Firm*—Workman Nydegger

(57) ABSTRACT

A method for calibration of a digital celestial sensor is disclosed. First, an integrated mathematic model for imaging of a celestial sensor is established according to external and internal parameters of the calibration system of the celestial sensor. Second, by rotating two axes of a rotator by different angles, calibration points data are acquired and sent to a processing computer through an interface circuit. Finally, a two-step calibration program is implemented to calculate the calibration parameters by substituting calibration points' data to the integrated mathematic model. An application device of the calibration method is also provided. The device may include a celestial simulator to provide simulated sunlight or starlight, a two-axis rotator to acquire different calibration points' data, and a processing computer to record the calibration points' data and calculate the calibration parameters.

4 Claims, 2 Drawing Sheets

METHOD AND DEVICE FOR CALIBRATION OF DIGITAL CELESTIAL SENSOR

CROSS-REFERENCE TO RELATED APPLICATIONS

This application is a Continuation-in-part application of U.S. Ser. No. 12/019,539 filed Jan. 24, 2008, which claims priority from Chinese Patent Application Serial No. 200710118498.1 filed Jul. 6, 2007, the disclosures of which, including the respective specifications, drawings and claims, are incorporated herein by reference in their entirety.

TECHNICAL FIELD

The disclosure relates to measurement techniques for a celestial sensor, especially to a kind of method and device for calibration of a digital celestial sensor.

BACKGROUND

Sun sensors and star sensors are two kinds of important celestial sensors and are widely used in many spacecrafts for attitude measurement. Sun sensors are a kind of attitude sensor for measuring the angle between the sun light and a certain axis or plane of a moving vehicle, and is widely used in many areas such as solar energy utilization and attitude control of spacecraft. New digital sun sensors mainly include: an optical mask with single pinhole or pinhole array, an image sensor such as CMOS (Complementary Metal Oxide Semiconductor) or CCD (Charge Coupled Device), and an information processing circuit.

The principle of a sun sensor is as follows: sun light is projected onto the image sensor though the pinhole on the optical mask and a spot is formed. The position of the spot changes with the incident angle of sun light. Then, spot image processing and attitude computing are executed by an information processing circuit, and finally, the attitude of the spacecraft is obtained.

A star sensor is a kind of high precision attitude measurement device for spacecraft that operates by observing stars. The principle of the star senor is as follows: a sky image is captured by an image sensor such as CCD or CMOS, and an image processing procedure is carried out to extract the centroid coordinates and brightness of the stars in the sky image. Next, a star identification program uses this information to find corresponding matches between measured stars (in sky image) and guide stars (in a star catalog). Finally a 3-axis attitude is obtained.

Before the celestial sensor is put into use, its internal parameters must be precisely calibrated to guarantee high measurement precision. The internal parameters include the focal length F of the optical system, an origin coordinate where the optical axis crosses the image sensor (also called as main point) and distortion coefficients, etc. The calibration of such internal parameters is referred to as celestial sensor calibration. Currently, there are two kinds of calibration methods. The first method is to utilize real sunlight or starlight and perform data acquisition and calibration. The second method uses a celestial simulator to provide simulated sunlight or starlight, and performs data acquisition and calibration with the help of a rotator. For the latter, only the focal length F and the main point coordinate are used in the calibration model, and the calibration precision is higher than the former. Further, the calibration process is more convenient. However, there are some disadvantages with this method.

For example, the sunlight or starlight vector from the celestial simulator is not strictly vertical to the plane formed by the two rotation axis of the rotator coordinate frame. Moreover, there is installation error between the celestial sensor and the rotator, such that the celestial sensor coordinate frame can not be identical to the rotator coordinate frame. Because of those external factors, such as installation error and adjustment error, there is error in the calibration method which uses only internal parameters in imaging modeling of celestial sensor. Therefore, the precision of estimation of internal parameters is influenced.

Generally, there is nonlinear distortion in the pinhole imaging model of the celestial sensor. So, errors are introduced into the calibration method which only includes internal parameters of the focal length F and the main point coordinate.

SUMMARY

To solve the problem mentioned above, the disclosure aims at providing a high precision calibration method for a digital celestial sensor. Another purpose of the disclosure is to provide a calibration device to implement the method.

To reach the aims above, an embodiment of the technical scheme of the disclosure is as follows.

A calibration method for a digital celestial sensor includes the following steps.

An integrated mathematic model for imaging of a celestial sensor is established according to external and internal parameters of a calibration system of the celestial sensor.

By rotating two axes of a rotator by different angles, calibration points' data is acquired and sent to a processing computer through an interface circuit.

A two-step calibration program is implemented to calculate calibration parameters after substituting the calibration points' data to the integrated mathematic model.

Step A Includes:

A1. Establishing a rotator coordinate frame and a celestial sensor coordinate frame, and establishing an external parameters modeling equation according to a rotation matrix from the rotator coordinate frame to the celestial sensor coordinate frame and the pitch and yaw angle of simulated sunlight or starlight in the rotator coordinate frame.

A2. Establishing an internal parameters modeling equation, wherein the internal parameters include: an origin coordinate wherein an optical axis crosses an image sensor (also referred to as a main point), a focal length of an optical system, and a radial and tangential distortion coefficient of the optical system.

A3. Establishing an integrated external and internal parameters imaging modeling equation of the celestial sensor according to the external parameters modeling equation and the internal parameters modeling equation of calibration system.

Step C Includes:

C1. Assuming that the radial and tangential distortion coefficients of the internal parameters are zeros, the main point coordinate is determined by a nonlinear least square iteration.

C2. Based on the results from step C1, the rest of the parameters are calculated by a nonlinear least square iteration.

A calibration device for digital celestial sensor comprises: a celestial simulator to provide simulated sunlight or starlight, a two-axis rotator with internal and external frames, a bracket on which the celestial sensor is installed, an optical platform to uphold the celestial simulator and the two-axis rotator, and a processing computer connecting with the celestial sensor to perform calibration data acquisition and processing. The celestial simulator and two-axis rotator are installed on each side of the optical platform respectively.

The processing computer, which comprises a data acquisition module and a data processing module, calculates calibration parameters by a data processing program.

The data acquisition module acquires the calibration points' data, which includes the rotating angle of the internal frame of the two-axis rotator, the rotating angle of the external frame of the two-axis rotator, and the centroid coordinate of imaging spot at this position.

The data processing module calculates the final calibration parameters based on the calibration points' data acquired above.

The calibration device and method of the disclosure has following advantages:

An integrated external and internal parameters modeling is adopted in disclosure, which avoids the introduction of the error of external parameters into the estimation process of internal parameters. Therefore, the calibration precision of internal parameters is improved.

The calibration precision of the celestial sensor is improved by considering the distortion coefficients as a part of internal parameters.

No complicated installation and adjustment is needed, so that the calibration process is simplified noticeably.

BRIEF DESCRIPTION OF THE DRAWINGS

The accompanying drawings, which are incorporated in and constitute a part of specification, illustrate an exemplary embodiment of the present disclosure and, together with the general description given above and the detailed description of the preferred embodiment given below, serve to explain the principles of the present disclosure.

DETAILED DESCRIPTION

Figure 1:
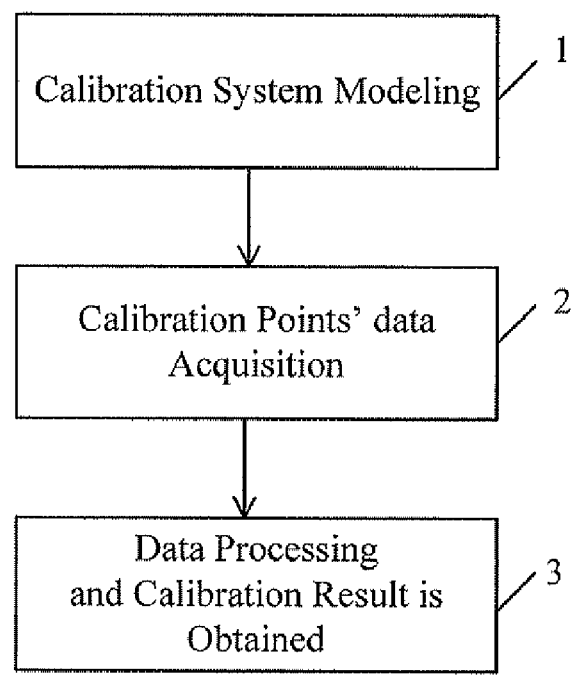
FIG. 1 is a flow chart for the calibration method of the present disclosure.

While the claims are not limited to the illustrated embodiments, an appreciation of various aspects of the present disclosure is best gained through a discussion of various examples thereof Referring now to the drawings, illustrative embodiments will be described in detail. Although the drawings represent the embodiments, the drawings are not necessarily to scale and certain features may be exaggerated to better illustrate and explain an innovative aspect of an embodiment. Further, the embodiments described herein are not intended to be exhaustive or otherwise limiting or restricting to the precise form and configuration shown in the drawings and disclosed in the following detailed description.

The basic principle of the disclosure is as follows. First, an integrated external and internal parameters imaging modeling of a celestial sensor is established, which takes into account the errors such as the installation error of a celestial simulator, the installation error of the celestial sensor on a two-axis rotator, the installation error and the distortion of an optical system, etc. Next, a two-step calibration method is implemented to solve the parameters and high precision of calibration is achieved.

The disclosure utilizes a sun sensor, for example, to describe the calibration method and device of a celestial sensor. However, it is understood that the present disclosure is not limited to a sun sensor.

In one embodiment, the disclosure uses an integrated external and internal parameters modeling method to establish a mathematic imaging model of a sun sensor. The detailed steps are as follows.

Step 1: The Integrated Imaging Model of Sun Sensor is Established According to External and Internal Parameters of the Calibration System of the Sun Sensor.

Step 101: Coordinate Frames are then Established.

Before describing the external parameters modeling, the coordinate frames involved in the disclosure are explained as follows.

A sun sensor coordinate frame (marked as Sun) is defined that its X-axis and Y-axis are the row and column of the image sensor respectively. The Z-axis is vertical to the X-Y plane.

A rotator coordinate frame (Marked as Rot) is defined that its X'-axis and Y'-axis are the horizontal rotation axis and vertical rotation axis of the rotator on which the sun sensor is installed, and the Z' axis of Rot is vertical to the X'-Y' plane.

The sun sensor coordinate frame and rotator coordinate frame defined in the disclosure are both right-hand coordinates (or left-hand coordinates).

Step 102: External Parameters Modeling

External parameters that have effect on the calibration precision of the internal parameters of the sun sensor include:

A sunlight vector e from a sun simulator is not strictly vertical to a plane formed by the two rotation axis of the rotator coordinate frame; assuming that the expression of vector e in the rotator coordinate frame is:

$$e = \begin{bmatrix} e1 \\ e2 \\ e3 \end{bmatrix} = \begin{bmatrix} \cos\beta\cos\alpha \\ \cos\beta\sin\alpha \\ \sin\beta \end{bmatrix} \quad (1)$$

Here, e1, e2, e3 are three direction components of vector e in the coordinate frame Rot, and $\alpha$, $\beta$ are the pitch and yaw angles in the coordinate frame Rot, respectively.

(2) There is installation error between the sun sensor and the rotator, which results in a difference of sun sensor coordinate frame Sun and rotator coordinate frame Rot. Assuming the rotation matrix Rsr denotes the rotation from rotator coordinate frame Rot to sun sensor coordinate frame Sun, is expressed as follows:

$$Rsr = Rot(Z', \phi1) * Rot(Y', \beta1) * Rot(X', \alpha1) \quad (2)$$

Here, Rot(X', α1), Rot(Y', β1) and Rot(Z', Φ1) are rotation matrices, which denote rotation angle of α1 about axis X', rotation angle of β1 about axis Y' and rotation angle of φ1 about axis Z' correspondingly. The rotator coordinate frame is transformed to the sun sensor frame coordinate by these rotations. The expressions of these rotations are:

$$Rot(Z', \varphi1) = \begin{bmatrix} \cos\varphi1 & -\sin\varphi1 & 0 \\ \sin\varphi1 & \cos\varphi1 & 0 \\ 0 & 0 & 1 \end{bmatrix} \quad (3)$$

$$Rot(Y', \beta 1) = \begin{bmatrix} \cos\beta 1 & 0 & \sin\beta 1 \\ 0 & 1 & 0 \\ -\sin\beta 1 & 0 & \cos\beta 1 \end{bmatrix}$$

$$Rot(X', \alpha 1) = \begin{bmatrix} 1 & 0 & 0 \\ 0 & \cos\alpha 1 & -\sin\alpha 1 \\ 0 & \sin\alpha 1 & \cos\alpha 1 \end{bmatrix}$$

From above formulas, it can be seen that there are five total external parameters in the calibration system of the sun sensor, namely $\alpha$, $\beta$, $\alpha 1$, $\beta 1$, $\phi 1$.

Step 103: Internal Parameters Modeling

There are errors in the installation of the optical mask of the sun sensor:

The distance between the optical mask and the imaging plane of the image sensor is not the ideal value F but the real value of F'.

The point where the pin hole on the optical mask of the sun sensor is projected to image sensor is not the origin of the sun sensor coordinate, and assuming that the coordinate of the real projected origin is $(x_0, y_0)$.

Moreover, there is distortion in the pinhole imaging because of the glass base of the optical mask of the sun sensor. Assuming that dx and dy represent distortion in x and y direction respectively The radial distortion coefficients and tangential distortion coefficients are expressed as:

$$\begin{cases} dx = x(q_1 r^2 + q_2 r^4 + q_3 r^6) + \{p_1(r^2 + 2x^2) + 2p_2 xy\}(1 + p_3 r^2) \\ dy = y(q_1 r^2 + q_2 r^4 + q_3 r^6) + \{p_2(r^2 + 2y^2) + 2p_1 xy\}(1 + p_3 r^2) \end{cases} \quad (4)$$

$$\begin{cases} x = x_C - x_0 \\ y = y_C - y_0 \\ r^2 = x^2 + y^2 \end{cases} \quad (5)$$

Here, $x_c$ and $y_c$ are the centroid coordinates of a measured spot; $x_0$ and $y_0$ are the coordinates of an origin corresponding to the pinhole; $q_1$, $q_2$, $q_3$ are radial distortion coefficients; $p_1$, $p_2$, $p_3$ are tangential distortion coefficients. So, there are a total of nine internal parameters, namely $x_0$, $y_0$, F', $q_1$, $q_2$, $q_3$, $p_1$, $p_2$, $p_3$.

Step 104: Establishing the Integrated External and Internal Parameters Imaging Model of the Sun Sensor The rotator is rotated to acquire different calibration points' data. Assuming that the real rotation angle about the Y' axis of rotator is $\theta 1$ and the rotation angle about the X' axis of rotator is $\theta 2$, the corresponding rotation matrix Rrot can be expressed as:

$$Rrot = Rot(X', \theta 2) * Rot(Y', \theta 1) \quad (6)$$

$$= \begin{bmatrix} \cos\theta 1 & 0 & -\sin\theta \\ 0 & 1 & 0 \\ \sin\theta 1 & 0 & \cos\theta 1 \end{bmatrix} * \begin{bmatrix} 1 & 0 & 0 \\ 0 & \cos\theta 2 & \sin\theta 2 \\ 0 & -\sin\theta 2 & \cos\theta 2 \end{bmatrix}$$

According to the external and internal parameters of the calibration system and the real rotation angles of the rotator in the calibration process, the integrated imaging model of sun sensor can be established as following:

$$V = \begin{bmatrix} f1 \\ f2 \\ f3 \end{bmatrix} = Rsr * Rrot * e = Rsr * Rrot * \begin{bmatrix} e1 \\ e2 \\ e3 \end{bmatrix} \quad (7)$$

$$\begin{cases} x_C = F' * \dfrac{f1}{f3} + x_0 + dx \\ y_C = F' * \dfrac{f2}{f3} + y_0 + dy \end{cases} \quad (8)$$

In the above formula, V is the expression of the sunlight vector e in the current sun sensor coordinate frame when the internal and external frames of the rotator are rotated by $\theta 1$ and $\theta 2$ respectively.

The integrated external and internal parameters imaging model of the sun sensor is obtained by substituting equations (1)~(7) into equation (8). The calibration of the sun sensor in the disclosure is to determine the internal parameters ($x_0$, $y_0$, F', $q_1$, $q_2$, $q_3$, $p_1$, $p_2$, $p_3$) and external parameters ($\alpha$, $\beta$, $\alpha 1$, $\beta 1$, $\phi 1$) in the modeling equation according to the calibration points' data.

Step 2: Acquisition of Calibration Points' Data

Figure 2:
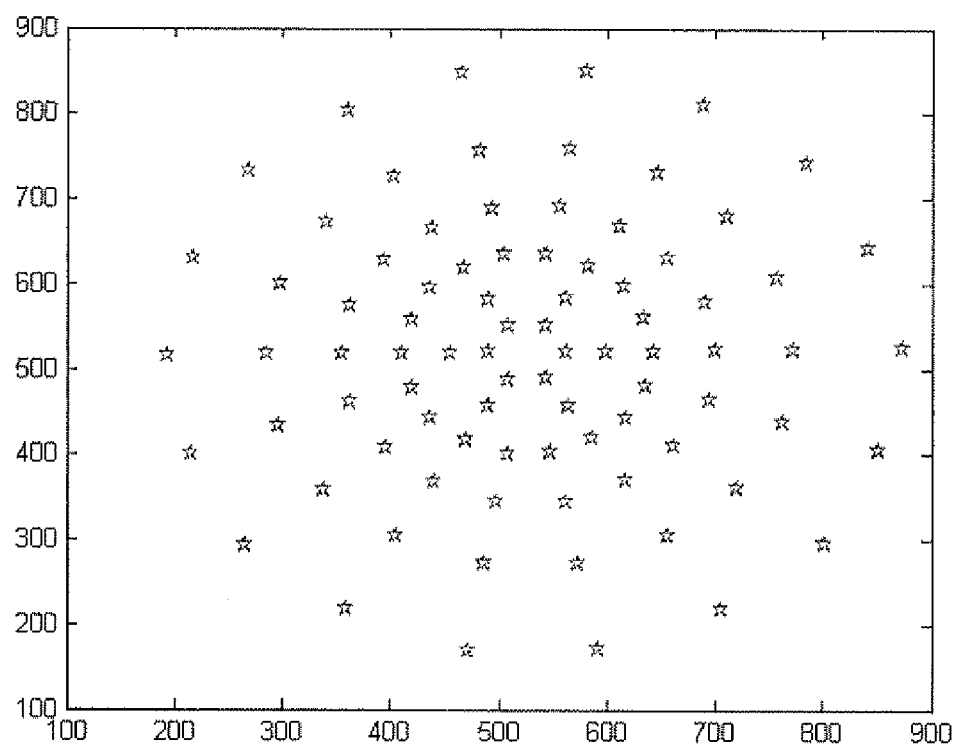
FIG. 2 is a schematic diagram showing the distribution of calibration points on an image sensor in the calibration of a sun sensor.

The two axes of the rotator are rotated by different angles to make sure the imaging spots spread over the whole plane of the image sensor with the sunlight within the field of view of ±55° (as shown in FIG. 2). An interface circuit of the sun sensor transfers the centroid coordinates ($x_c$, $y_c$) of the imaging spot to the processing computer at each rotation position of the rotator. The processing computer records the rotation angle $\theta 1$ of the external frame and the rotation angle $\theta 2$ of the internal frame simultaneously. When the rotator has rotated for m different positions, m groups of calibration points' data are acquired.

Step 3: Data Processing

It can be seen from the model equation that there are a total of 14 calibration parameters in the calibration system. The precision of these parameters are relatively low and the iteration can't easily converge if all 14 parameters are determined by a one-time least square method. Therefore, a two-step method is adopted to calculate the 14 parameters.

Step 301: Determination of the Internal Parameters $x_0$ and $y_0$

Firstly, assume that the distortion coefficients $q_1$, $q_2$, $q_3$, $p_1$, $p_2$, $p_3$ are all equal to zero, so the model equation (8) can be simplified as:

$$\begin{cases} x_C = F' * \dfrac{f1}{f3} + x_0 = f_x(n) \\ y_C = F' * \dfrac{f2}{f3} + y_0 = f_y(n) \end{cases} \quad (9)$$

Here, n is a parameter vector which consists of model parameters $[x_0, y_0, F', \alpha, \beta, \alpha 1, \beta 1, \phi 1]$. Since $f_x$ and $f_y$ are both nonlinear functions, a nonlinear least square iteration method is adopted to estimate the parameter vector n. Assuming that $x_c$ and $y_c$ are a measured value while $\hat{x}_c$ and $\hat{y}_c$ are estimated values, and $\Delta n$ is the estimated deviation of the parameter vector, and $\Delta x$ and $\Delta y$ are an estimated deviation of $x_c$ and $y_c$ respectively, it gets $$\begin{cases} \Delta x = x_C - \hat{x}_C \approx A\Delta n \\ \Delta y = y_C - \hat{y}_C \approx B\Delta n \end{cases} \quad (10)$$

Here, A and B are sensitive matrixes, and their expressions are:

$$\begin{cases} A = \left[ \dfrac{\partial f_x}{\partial x_0} \ \dfrac{\partial f_x}{\partial y_0} \ \dfrac{\partial f_x}{\partial F'} \ \dfrac{\partial f_x}{\partial \alpha} \ \dfrac{\partial f_x}{\partial \beta} \ \dfrac{\partial f_x}{\partial \alpha 1} \ \dfrac{\partial f_x}{\partial \beta 1} \ \dfrac{\partial f_x}{\partial \varphi 1} \right] \\ B = \left[ \dfrac{\partial f_y}{\partial x_0} \ \dfrac{\partial f_y}{\partial y_0} \ \dfrac{\partial f_y}{\partial F'} \ \dfrac{\partial f_y}{\partial \alpha} \ \dfrac{\partial f_y}{\partial \beta} \ \dfrac{\partial f_y}{\partial \alpha 1} \ \dfrac{\partial f_y}{\partial \beta 1} \ \dfrac{\partial f_y}{\partial \varphi 1} \right] \end{cases} \quad (11)$$

Assuming that the number of calibration points' data is m, combining the estimated deviation $\Delta x$ and $\Delta y$ and the sensitive matrixes, the iteration equation of parameter vector is established as follows.

$$\Delta n^{(k+1)} = \Delta n^{(k)} - (M_k^T M_k)^{-1} M_k^T P^{(k)} \quad (12)$$

In the above equation, P consists of an estimated deviation $\Delta x$ and $\Delta y$, and M consists of two sensitive matrixes A and B. Their expressions are:

$$P = \begin{bmatrix} \Delta x_1 \\ \vdots \\ \Delta x_m \\ \Delta y_1 \\ \vdots \\ \Delta y_m \end{bmatrix} \cdot M = \begin{bmatrix} A_1 \\ \vdots \\ A_m \\ B_1 \\ \vdots \\ B_m \end{bmatrix}$$

Here, k is the iteration times and can be set between 5 and 10. Among the calculated model parameters, when iteration ends, only ($x_0$, $y_0$) is chosen as the final calibration result to be used in next step to determinate the other parameters.

Step 302: Determination of Internal Parameters F', $q_1$, $q_2$, $q_3$, $p_1$, $p_2$, $p_3$ and external parameters Substituting ($x_0$, $y_0$) calculated from the previous step into the model equation (8), and using vector j to denote model parameters [F', $q_1$, $q_2$, $q_3$, $p_1$, $p_2$, $p_3$, $\alpha$, $\beta$, $\alpha 1$, $\beta 1$, $\phi 1$], it gets:

$$\begin{cases} \Delta x = x_C - \hat{x}_C \approx C\Delta j \\ \Delta y = y_C - \hat{y}_C \approx D\Delta j \end{cases}$$

Correspondingly, the sensitive matrixes C and D change to:

$$\begin{cases} C = \left[ \dfrac{\partial f_x}{\partial F'} \ \dfrac{\partial f_x}{\partial q1} \ \dfrac{\partial f_x}{\partial q2} \ \dfrac{\partial f_x}{\partial q3} \ \dfrac{\partial f_x}{\partial p1} \ \dfrac{\partial f_x}{\partial p2} \ \dfrac{\partial f_x}{\partial p3} \ \dfrac{\partial f_x}{\partial \alpha} \ \dfrac{\partial f_x}{\partial \beta} \ \dfrac{\partial f_x}{\partial \alpha 1} \ \dfrac{\partial f_x}{\partial \beta 1} \ \dfrac{\partial f_x}{\partial \varphi 1} \right] \\ D = \left[ \dfrac{\partial f_y}{\partial F'} \ \dfrac{\partial f_y}{\partial q1} \ \dfrac{\partial f_y}{\partial q2} \ \dfrac{\partial f_y}{\partial q3} \ \dfrac{\partial f_y}{\partial p1} \ \dfrac{\partial f_y}{\partial p2} \ \dfrac{\partial f_y}{\partial p3} \ \dfrac{\partial f_y}{\partial \alpha} \ \dfrac{\partial f_y}{\partial \beta} \ \dfrac{\partial f_y}{\partial \alpha 1} \ \dfrac{\partial f_y}{\partial \beta 1} \ \dfrac{\partial f_y}{\partial \varphi 1} \right] \end{cases}$$

A same nonlinear least square iteration method is adopted to estimate the parameter vector j, and a similar iteration equation of parameter vector is established $$\Delta j^{(k+1)} = \Delta j^{(k)} - (N_k^T N_k)^{-1} N_k^T P^{(k)} \quad (13)$$

In the above equation, N comprises sensitive matrixes C and D, and their expressions are:

$$N = \begin{bmatrix} C_1 \\ \vdots \\ C_m \\ D_1 \\ \vdots \\ D_m \end{bmatrix}$$

Here, k is iteration times and can be set between 5 and 10. When the iteration ends, the model parameters F', $q_1$, $q_2$, $q_3$, $p_1$, $p_2$, $p_3$, $\alpha$, $\beta$, $\alpha 1$, $\beta 1$ and $\phi 1$ are determined and chosen as the final calibration result.

Combining ($x_0$, $y_0$) determined in the first step and F', $q_1$, $q_2$, $q_3$, $p_1$, $p_2$, $p_3$, $\alpha$, $\beta$, $\alpha 1$, $\beta 1$, $\phi 1$ determined in the second step, all the calibration parameters in the calibration system are determined.

Finally, all calibrated internal parameters $x_0$, $y_0$, F', $q_1$, $q_2$, $q_3$, $p_1$, $p_2$ and $p_3$ are substituted into corresponding attitude conversion formulas of the sun sensor, then precise attitude angle of the sunlight in the sun sensor coordinate frame will be calculated. Thereby, the attitude information of the satellites or spacecraft on which the sun sensor is installed is determined.

Figure 3:
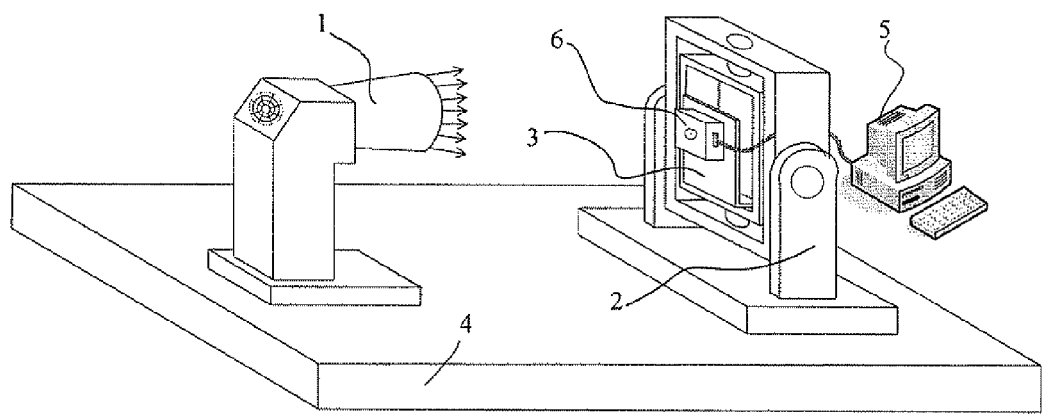
FIG. 3 is a schematic diagram showing a structure of a calibration device of the present disclosure.

As shown in FIG. 3, the calibration device in the disclosure comprises a sun simulator 1 to provide sunlight, a two-axis rotator 2 with external and internal frames, a bracket 3 to install the sun sensor, an optical platform 4 to uphold the sun simulator 1 and two-axis rotator 2, and a processing computer 5 to perform data acquisition and computing. The sun simulator 1 and the two-axis rotator 2 are installed on the each side of the optical platform respectively, and the sun simulator is used to provide needed sunlight.

The processing computer 5 includes a data acquisition module and a data processing module. The data acquisition module acquires the calibration points' data, which includes the rotating angle $\theta 1$ of the external frame, the rotating angle $\theta 2$ of the internal frame and the centroid coordinate ($x_c$, $y_c$) of imaging spots at this position. A two-step method and nonlinear least square method are used by the data processing module to determine the final calibration parameters. During the calibration process using the calibration device, the sun sensor 6 is installed on the bracket 3. Different calibration points' data is acquired by rotating the external and internal frames of the rotator by different angles. The processing computer 5 records these calibration points' data and calculates the corresponding calibration parameters.

In one specific embodiment, the rotator used in the disclosure has the precision of ±0.4" for the external frame and ±0.3" for the internal frame. The radiation intensity of the sun simulator is a 0.1 solar constant. The diameter of the effective radiation area is 200 mm, and the collimation angle of light beam is 32'.

A total of 84 groups of recorded calibration point's data are listed below in Table 1.

TABLE 1

| | m | | | | | | |
|---|---|---|---|---|---|---|---|
| | 1 | 2 | 3 | 4 | 5 | 6 | 7 |
| θ1(°) | 8 | 4 | −4 | −8 | −4 | 4 | 16 |
| θ2(°) | 0 | 7 | 7 | 0 | −7 | −7 | 0 |
| $x_c$(pixel) | 490.5938 | 507.8291 | 543.1906 | 561.3750 | 544.1250 | 508.5344 | 454.1313 |
| $y_c$(pixel) | 518.7813 | 549.8000 | 550.2844 | 519.7188 | 488.4250 | 488.0000 | 518.3125 |

| | m | | | | | | |
|---|---|---|---|---|---|---|---|
| | 8 | 9 | 10 | 11 | 12 | 13 | 14 |
| θ1(°) | 8 | −8 | −16 | −8 | 8 | 25 | 23 |
| θ2(°) | 14 | 14 | 0 | −14 | −14 | 0 | 9 |
| $x_c$(pixel) | 488.9906 | 561.3781 | 598.2000 | 563.4437 | 490.2813 | 410.2156 | 419.0313 |
| $y_c$(pixel) | 580.9938 | 582.0313 | 520.2000 | 456.7437 | 455.8750 | 517.9063 | 557.2813 |

| | m | | | | | | |
|---|---|---|---|---|---|---|---|
| | 15 | 16 | 17 | 18 | 19 | 20 | 21 |
| θ1(°) | 19 | 12 | 4 | −4 | −12 | −19 | −23 |
| θ2(°) | 17 | 22 | 25 | 25 | 22 | 17 | 9 |
| $x_c$(pixel) | 436.1250 | 468.1187 | 505.5250 | 543.6625 | 581.6875 | 614.8469 | 633.0531 |
| $y_c$(pixel) | 593.8063 | 618.4063 | 634.1969 | 634.8125 | 620.2500 | 596.7156 | 560.3156 |

| | m | | | | | | |
|---|---|---|---|---|---|---|---|
| | 22 | 23 | 24 | 25 | 26 | 27 | 28 |
| θ1(°) | −25 | −23 | −19 | −12 | −4 | 4 | 12 |
| θ2(°) | 0 | −9 | −17 | −22 | −25 | −25 | −22 |
| $x_c$(pixel) | 643.1250 | 634.8219 | 617.9156 | 585.3406 | 547.1594 | 508.2531 | 469.8563 |
| $y_c$(pixel) | 520.9688 | 481.0000 | 443.5812 | 418.2250 | 402.0125 | 401.6594 | 417.0469 |

| | m | | | | | | |
|---|---|---|---|---|---|---|---|
| | 29 | 30 | 31 | 32 | 33 | 34 | 35 |
| θ1(°) | 19 | 23 | 35 | 33 | 26 | 17 | 6 |
| θ2(°) | −17 | −9 | 0 | 13 | 24 | 31 | 35 |
| $x_c$(pixel) | 437.0000 | 419.3781 | 354.5000 | 362.7813 | 394.7813 | 437.6250 | 492.9063 |
| $y_c$(pixel) | 441.6469 | 478.4469 | 517.4063 | 574.0000 | 626.4375 | 664.5938 | 689.2500 |

| | m | | | | | | |
|---|---|---|---|---|---|---|---|
| | 36 | 37 | 38 | 39 | 40 | 41 | 42 |
| θ1(°) | −6 | −17 | −26 | −33 | −35 | −33 | −26 |
| θ2(°) | 35 | 31 | 24 | 13 | 0 | −13 | −24 |
| $x_c$(pixel) | 555.3750 | 611.7813 | 656.3750 | 690.6563 | 700.6437 | 693.6906 | 661.6844 |
| $y_c$(pixel) | 690.3750 | 667.5625 | 630.6000 | 578.7875 | 521.9219 | 464.2500 | 409.8344 |

| | m | | | | | | |
|---|---|---|---|---|---|---|---|
| | 43 | 44 | 45 | 46 | 47 | 48 | 49 |
| θ1(°) | −17 | −6 | 6 | 17 | 26 | 33 | 45 |
| θ2(°) | −31 | −35 | −35 | −31 | −24 | −13 | 0 |
| $x_c$(pixel) | 617.9688 | 560.8750 | 496.5656 | 439.3875 | 395.3531 | 362.8438 | 285.8062 |
| $y_c$(pixel) | 369.9438 | 344.2781 | 343.6938 | 368.3125 | 407.1563 | 460.4375 | 516.8438 |

| | m | | | | | | |
|---|---|---|---|---|---|---|---|
| | 50 | 51 | 52 | 53 | 54 | 55 | 56 |
| θ1(°) | 42 | 33 | 21 | 7 | −7 | −21 | −33 |
| θ2(°) | 19 | 33 | 41 | 45 | 45 | 41 | 33 |
| $x_c$(pixel) | 297.7500 | 340.0313 | 402.8937 | 482.1781 | 564.8781 | 645.9562 | 711.8312 |
| $y_c$(pixel) | 599.5625 | 672.4063 | 724.9406 | 756.8063 | 758.4031 | 729.5563 | 678.7188 |

| | m | | | | | | |
|---|---|---|---|---|---|---|---|
| | 57 | 58 | 59 | 60 | 61 | 62 | 63 |
| θ1(°) | −42 | −45 | −42 | −33 | −21 | −7 | 7 |
| θ2(°) | 19 | 0 | −19 | −33 | −41 | −45 | −45 |

TABLE 1-continued

| $x_c$(pixel) | 757.7719 | 772.5313 | 763.1094 | 720.9344 | 656.031 | 573.1188 | 486.9376 |
|---|---|---|---|---|---|---|---|
| $y_c$(pixel) | 606.5938 | 523.2250 | 438.1875 | 361.4688 | 305.3438 | 271.6875 | 271.1250 |

| | m | | | | | | |
|---|---|---|---|---|---|---|---|
| | 64 | 65 | 66 | 67 | 68 | 69 | 70 |
| $\theta_1(°)$ | 21 | 33 | 42 | 55 | 50 | 39 | 24 |
| $\theta_2(°)$ | −41 | −33 | −19 | 0 | 26 | 43 | 51 |
| $x_c$(pixel) | 404.1875 | 339.4063 | 296.8750 | 192.3687 | 216.7094 | 268.3406 | 360.0000 |
| $y_c$(pixel) | 303.5313 | 358.1250 | 433.1563 | 516.1063 | 630.3469 | 732.7344 | 802.9063 |

| | m | | | | | | |
|---|---|---|---|---|---|---|---|
| | 71 | 72 | 73 | 74 | 75 | 76 | 77 |
| $\theta_1(°)$ | 8 | −8 | −24 | −39 | −50 | −55 | −50 |
| $\theta_2(°)$ | 55 | 55 | 51 | 43 | 26 | 0 | −26 |
| $x_c$(pixel) | 466.2719 | 579.3750 | 688.5125 | 785.5000 | 842.8563 | 872.4375 | 851.6000 |
| $y_c$(pixel) | 847.9688 | 850.5031 | 809.8906 | 742.6594 | 640.5406 | 525.0313 | 406.3125 |

| | m | | | | | | |
|---|---|---|---|---|---|---|---|
| | 78 | 79 | 80 | 81 | 82 | 83 | 84 |
| $\theta_1(°)$ | −39 | −24 | −8 | 8 | 24 | 39 | 50 |
| $\theta_2(°)$ | −43 | −51 | −55 | −55 | −51 | −43 | −26 |
| $x_c$(pixel) | 801.0313 | 704.8688 | 591.8750 | 471.9031 | 359.5313 | 264.8906 | 214.3094 |
| $y_c$(pixel) | 296.0969 | 219.2594 | 170.4094 | 169.8906 | 217.6375 | 292.5125 | 400.0000 |

A calibration result is obtained by processing the calibration points' data listed in Table 1 using the calibration method described above. The calibration result is listed in Table 2.

TABLE 2

| $x_0$(pixel) | $y_0$(pixel) | F'(pixel) | q1 | q2 | q3 | p1 |
|---|---|---|---|---|---|---|
| 523 | 525 | 251 | −7.27e−7 | 3.28e−12 | −7.826e−18 | 4.85e−6 |
| p2 | p3 | $\alpha(°)$ | $\beta(°)$ | $\alpha_1(°)$ | $\beta_1(°)$ | $\phi_1(°)$ |
| 1.98e−7 | −1.6e−6 | 44.832 | 93.798 | 1.686 | 0.354 | 0.786 |

The total statistical square root error of $x_c$ and $y_c$ are 5.09 pixels and 4.27 pixels respectively. Substituting the parameters calibrated by the method of the present disclosure into the attitude computing formula of the sun sensor, an attitude precision of 0.02 (1σ) is obtained. Because totally 14 external and internal parameters are used in the invention, theoretically at least 14 groups of calibration data are needed to solve the calibration parameters. Generally, in order to obtain more precise parameters, 50-100 groups of calibration data are acquired. Meanwhile, the calibration points spread over the field of view of sun sensor as widely as possible. Of course, the more the calibration points are used, the more precise the calibration result are, but at the cost of computing.

Replacing the sun sensor and sun simulator with a star sensor and star simulator respectively, the star sensor can be calibrated in the same way with high precision independent of complicated installment and adjustment.

An example of calibration of the star sensor using the calibration method in the disclosure is provided as follows.

The star sensor to be calibrated has a field of view of 10.9'×10.9' and a 1024×1024 image sensor with a pixel element size of 0.015×0.015 mm. The star simulator can provide starlight with a magnitude from 4 Mv to 8 Mv.

Figure 4:
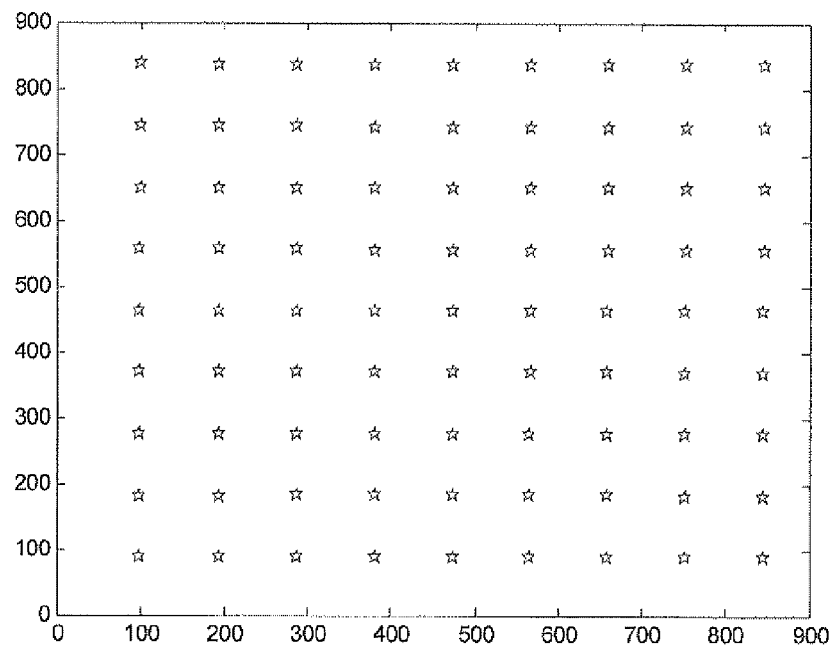
FIG. 4 is a schematic diagram showing the distribution of the calibration points on the image sensor in the calibration of the star sensor.

Similar to the data acquisition process of the calibration of the sun sensor, rotating the two axes of the rotator by different angles to make sure the imaging (star) spots spread over the whole plane of the image sensor within the field of view of ±4 (as shown in FIG. 4), a total of 81 groups of the calibration point's data are acquired (as shown in Table. 3).

TABLE 3

| | m | | | | | | |
|---|---|---|---|---|---|---|---|
| | 1 | 2 | 3 | 4 | 5 | 6 | 7 |
| $\theta_1(°)$ | −4 | −3 | −2 | −1 | 0 | 1 | 2 |
| $\theta_2(°)$ | 4 | 4 | 4 | 4 | 4 | 4 | 4 |

TABLE 3-continued

| | | | | | | | |
|---|---|---|---|---|---|---|---|
| $x_c$(pixel) | 846.023 | 846.0038 | 846.0034 | 845.991 | 846.0664 | 846.1506 | 846.2582 |
| $y_c$(pixel) | 87.5376 | 181.2595 | 274.7782 | 368.2523 | 461.5407 | 554.8719 | 648.2764 |

| | m | | | | | | |
|---|---|---|---|---|---|---|---|
| | 8 | 9 | 10 | 11 | 12 | 13 | 14 |
| $\theta1(°)$ | 3 | 4 | 4 | 3 | 2 | 1 | 0 |
| $\theta2(°)$ | 4 | 4 | 3 | 3 | 3 | 3 | 3 |
| $x_c$(pixel) | 846.4803 | 846.6616 | 753.1895 | 753.0588 | 752.9397 | 752.8297 | 752.6954 |
| $y_c$(pixel) | 741.6939 | 835.3656 | 835.1762 | 741.5762 | 648.1623 | 554.9021 | 461.6425 |

| | m | | | | | | |
|---|---|---|---|---|---|---|---|
| | 15 | 16 | 17 | 18 | 19 | 20 | 21 |
| $\theta1(°)$ | −1 | −2 | −3 | −4 | −4 | −3 | −2 |
| $\theta2(°)$ | 3 | 3 | 3 | 3 | 2 | 2 | 2 |
| $x_c$(pixel) | 752.6478 | 752.6125 | 752.6111 | 752.6793 | 659.4337 | 659.3499 | 659.3284 |
| $y_c$(pixel) | 368.3785 | 275.0673 | 181.5721 | 87.8912 | 88.1736 | 181.7621 | 275.2395 |

| | m | | | | | | |
|---|---|---|---|---|---|---|---|
| | 22 | 23 | 24 | 25 | 26 | 27 | 28 |
| $\theta1(°)$ | −1 | 0 | 1 | 2 | 3 | 4 | 4 |
| $\theta2(°)$ | 2 | 2 | 2 | 2 | 2 | 2 | 1 |
| $x_c$(pixel) | 659.3432 | 659.4309 | 659.5709 | 659.72 | 659.8921 | 660.0049 | 566.8324 |
| $y_c$(pixel) | 368.5127 | 461.7081 | 554.9435 | 648.1823 | 741.5134 | 835.044 | 835.0712 |

| | m | | | | | | |
|---|---|---|---|---|---|---|---|
| | 29 | 30 | 31 | 32 | 33 | 34 | 35 |
| $\theta1(°)$ | 3 | 2 | 1 | 0 | −1 | −2 | −3 |
| $\theta2(°)$ | 1 | 1 | 1 | 1 | 1 | 1 | 1 |
| $x_c$(pixel) | 566.6722 | 566.5035 | 566.2811 | 566.1572 | 566.133 | 566.1131 | 566.0962 |
| $y_c$(pixel) | 741.5379 | 648.2287 | 554.9968 | 461.7978 | 368.5974 | 275.3243 | 181.8933 |

| | m | | | | | | |
|---|---|---|---|---|---|---|---|
| | 36 | 37 | 38 | 39 | 40 | 41 | 42 |
| $\theta1(°)$ | −4 | −4 | −3 | −2 | −1 | 0 | 1 |
| $\theta2(°)$ | 1 | 0 | 0 | 0 | 0 | 0 | 0 |
| $x_c$(pixel) | 566.1277 | 473.0167 | 472.988 | 473.036 | 473.0403 | 473.0709 | 473.137 |
| $y_c$(pixel) | 88.2568 | 88.2656 | 181.9414 | 275.3722 | 368.6592 | 461.866 | 555.1176 |

| | m | | | | | | |
|---|---|---|---|---|---|---|---|
| | 43 | 44 | 45 | 46 | 47 | 48 | 49 |
| $\theta1(°)$ | 2 | 3 | 4 | 4 | 3 | 2 | 1 |
| $\theta2(°)$ | 0 | 0 | 0 | −1 | −1 | −1 | −1 |
| $x_c$(pixel) | 473.3198 | 473.4968 | 473.6655 | 380.4244 | 380.245 | 380.0918 | 379.9698 |
| $y_c$(pixel) | 648.3413 | 741.6483 | 835.2176 | 835.4632 | 741.859 | 648.5022 | 555.2623 |

| | m | | | | | | |
|---|---|---|---|---|---|---|---|
| | 50 | 51 | 52 | 53 | 54 | 55 | 56 |
| $\theta1(°)$ | 0 | −1 | −2 | −3 | −4 | −4 | −3 |
| $\theta2(°)$ | −1 | −1 | −1 | −1 | −1 | −2 | −2 |
| $x_c$(pixel) | 379.8922 | 379.8083 | 379.7638 | 379.778 | 379.8063 | 286.3837 | 286.3974 |
| $y_c$(pixel) | 461.9989 | 368.7132 | 275.4092 | 181.9218 | 88.2488 | 88.0188 | 181.7662 |

| | m | | | | | | |
|---|---|---|---|---|---|---|---|
| | 57 | 58 | 59 | 60 | 61 | 62 | 63 |
| $\theta1(°)$ | −2 | −1 | 0 | 1 | 2 | 3 | 4 |
| $\theta2(°)$ | −2 | −2 | −2 | −2 | −2 | −2 | −2 |
| $x_c$(pixel) | 286.41 | 286.4695 | 286.5712 | 286.612 | 286.7459 | 286.907 | 287.0918 |
| $y_c$(pixel) | 275.3348 | 368.7194 | 462.0791 | 555.3959 | 648.7273 | 742.1938 | 835.8131 |

TABLE 3-continued

| | m | | | | | | |
|---|---|---|---|---|---|---|---|
| | 64 | 65 | 66 | 67 | 68 | 69 | 70 |
| $\theta1(°)$ | 4 | 3 | 2 | 1 | 0 | −1 | −2 |
| $\theta2(°)$ | −3 | −3 | −3 | −3 | −3 | −3 | −3 |
| $x_c$(pixel) | 193.6289 | 193.4583 | 193.3174 | 193.1805 | 193.0724 | 192.9838 | 192.9098 |
| $y_c$(pixel) | 836.2621 | 742.5339 | 648.9849 | 555.5375 | 462.1253 | 368.668 | 275.1848 |

| | m | | | | | | |
|---|---|---|---|---|---|---|---|
| | 71 | 72 | 73 | 74 | 75 | 76 | 77 |
| $\theta1(°)$ | −3 | −4 | −4 | −3 | −2 | −1 | 0 |
| $\theta2(°)$ | −3 | −3 | −4 | −4 | −4 | −4 | −4 |
| $x_c$(pixel) | 192.8675 | 192.9053 | 99.1793 | 99.1509 | 99.1857 | 99.2415 | 99.3311 |
| $y_c$(pixel) | 181.5179 | 87.6925 | 87.3046 | 181.2268 | 275.0071 | 368.6396 | 462.224 |

| | m | | | |
|---|---|---|---|---|
| | 78 | 79 | 80 | 81 |
| $\theta1(°)$ | 1 | 2 | 3 | 4 |
| $\theta2(°)$ | −4 | −4 | −4 | −4 |
| $x_c$(pixel) | 99.4387 | 99.5852 | 99.7679 | 99.9614 |
| $y_c$(pixel) | 555.7563 | 649.3598 | 743.0164 | 836.8736 |

The calibration result is listed in Table 4.

TABLE 4

| $x_0$(pixel) | $y_0$(pixel) | F'(mm) | q1 | q2 | q3 | p1 |
|---|---|---|---|---|---|---|
| 495 | 506 | 80.0891 | 3.2184e−6 | 8.0914e−9 | −3.2403e−10 | −1.7636e−5 |
| p2 | p3 | $\alpha(°)$ | $\beta(°)$ | $\alpha1(°)$ | $\beta1(°)$ | $\phi1(°)$ |
| −7.5307e−5 | −6.4e−3 | 74.7025 | 89.0048 | −1.1935 | −0.2108 | 0.0536 |

The root of mean square (RMS) error of $x_c$ and $y_c$ are 0.0702 pixel and 0.0707 pixel respectively. Substituting the calibrated parameters into the attitude computing formula of the star sensor, an attitude precision of 3.8" (1σ) is obtained.

The foregoing description of various embodiments of the disclosure has been present for purpose of illustration and description. It is not intent to be exhaustive or to limit the disclosure to the precise embodiments disclosed. Numerous modifications or variations are possible in light of the above teachings. The embodiments discussed where chosen and described to provide the best illustration of the principles of the disclosure and its practical application to thereby enable one of ordinary skill in the art to utilize the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

What is claimed is:

1. A method for calibration of a digital celestial sensor comprising the steps of:
   A. establishing an integrated mathematic model for imaging of the celestial sensor according to external and internal parameters of a calibration system of the celestial sensor;
   B. acquiring, via an image sensor, calibration points' data by rotating two axes of a rotator to which the image sensor is attached by different angles, and then receiving the calibration points' data at a processing computer through an interface circuit; and
   C. calculating, by the processing computer, calibration parameters using a two-step calibration program after substituting calibration points' data to the integrated mathematic model, the calculated calibration parameters including an origin coordinate where an optical axis of the celestial sensor crosses the image sensor.

2. The method for calibration of a digital celestial sensor in claim 1, wherein said step A further comprises the steps of:
   A1. establishing a rotator coordinate frame and a celestial sensor coordinate frame, and establishing an external parameters modeling equation according to a rotation matrix from the rotator coordinate frame to the celestial sensor coordinate frame and pitch and yaw angles of an initial vector of simulated sunlight or starlight in the rotator coordinate frame;
   A2. establishing an internal parameters modeling equation, wherein said internal parameters include: the origin coordinate, a focal length of an optical system, and a radial and tangential distortion coefficients of the optical system; and
   A3. establishing an integrated external and internal parameters imaging modeling equation of the celestial sensor according to the external parameters modeling equation and the internal parameters modeling equation of the calibration system.

3. The method for calibration of a digital celestial sensor in claim 1 or claim 2, wherein said step C further comprises:

C1. assuming that radial and tangential distortion coefficients of the internal parameters are zeros, the origin coordinate is determined by a nonlinear least square iteration; and C2. based on the results from step C1, other parameters are calculated by a nonlinear least square iteration.

4. A device for calibration of a digital celestial sensor comprising:

a celestial simulator to provide simulated sunlight or starlight;

a two-axis rotator with internal and external frames;

a bracket on which the celestial sensor is installed;

an optical platform to uphold the celestial simulator and the two-axis rotator wherein the celestial simulator and two-axis rotator are installed on each side of the optical platform, respectively; and a processing computer connecting with the celestial sensor to perform calibration data acquisition and calculation;

wherein:

the processing computer comprises a data acquisition module and a data processing module that calculates calibration parameters by a data processing program;

the data acquisition module acquires the calibration points' data which includes a rotating angle of the internal frame of the two-axis rotator, the rotating angle of the external frame of the two-axis rotator and a centroid coordinate of an imaging spot at this position; and the data processing module calculates the final calibration parameters based on the acquired calibration points' data.

* * * * *